Patented Feb. 12, 1935

1,991,007

UNITED STATES PATENT OFFICE 1,991,007

ADHESIVE COMPOSITION

Robert D. Bonney, Glen Ridge, and Arnaud G. de Boer, Kearny, N. J., assignors to Congoleum-Nairn, Inc., a corporation of New York No Drawing. Application April 22, 1933, Serial No. 667,500

12 Claims. (Cl. 134—26)

The present invention relates to adhesive compositions and more particularly to adhesive compositions especially adapted for the installation of linoleum.

It is customary, in the installation of linoleum, to bond the covering to the sub-surface with an adhesive or cement. The adhesives heretofore known and used may be classified into two groups according to type, namely, the water-solvent type and the so-called waterproof type. Adhesives of the first type usually comprise a water solution of dextrine, glue, sodium silicate, lignin, or the like, to which is added an inert filler of clay, talc, etc. Adhesives of the second or waterproof type usually comprise a water-resistant resin such as shellac, copal, para-coumarone, or the like, dissolved in an organic solvent, as for example, alcohol or benzol, and also an inert filler of asbestine, clay or talc. The water-base adhesives are more commonly used and, under favorable conditions, yield quite satisfactory results. The waterproof type of adhesives are used less frequently, usually where it is necessary to install linoleum on sub-surfaces which are not entirely dry, or in forming the seams of an installation which may be subject to frequent washings.

While in many cases it is possible to obtain good installations of linoleum with either or both of the above-described types of adhesives, conditions frequently occur where neither type can be used successfully. For example, there is a constant demand for the prompt installation of linoleum in new buildings where the concrete is fresh or "green", i. e., where the concrete has dried but a short time and therefore contains an excessive amount of moisture. Again, it is frequently desirable to install linoleum at or below grade where the sub-floor or wall is continually or intermittently damp. In neither of these cases will any of the present known adhesives assure a satisfactory installation. Adhesives of the water-solvent type will not harden or set and the continued presence of the water in the adhesive causes the linoleum to swell and buckle. Adhesives of the waterproof type are but little better, for the solvent, if water-immiscible, does not readily diffuse away and by remaining, not only prevents the adhesive from setting but also attacks and disintegrates the linoleum itself. In other cases, even though the solvent does diffuse away or evaporate, the resinous binder is shortly destroyed by the action of alkaline moisture from the concrete.

After extensive research, we have discovered and developed a new and distinct type of adhesive which, from exhaustive tests, we have found to produce satisfactory linoleum installations under the most adverse conditions. Particularly is this improved adhesive adapted for the installation of linoleum on fresh or "green" concrete, an objective which has long been desired but never obtained.

Our invention is based first upon the recognition of certain fundamental principles and, second upon the observance of these principles in the formulation of our improved adhesive. Broadly the invention contemplates an improved adhesive composition comprising three components, each of prime importance; first, a water and alkali-resistive binder; second, a water-miscible solvent for the binder; and third, a water-reactive and water-hardened filler. Also it will usually be found desirable to add a minor amount of a fibrous suspension agent to prevent the water-reactive filler from settling or caking. The proportion of each component may be varied within substantial limits, a generic formula being stated as follows:—

| | Percent |
|---|---|
| Water and alkali-resistant binder | 20 to 35 |
| Water-reactive filler | 45 to 70 |
| Fibrous suspension agent | 3 to 10 |
| Water-miscible solvent | 5 to 15 |

Considering now the preferred formulation of our novel adhesive, the selected binder material is para-coumarone resin. This substance adequately fulfills the requirements of water and alkali-resistance. It will not soften under the action of the alkaline solutions formed by the permeation of moisture through concrete sub-floors, nor is it appreciably affected by long exposure to water. It may be dissolved in solvents of the type required in observing the principles of our invention and, being only slightly acid in character, is non-reactive with the filler material. It will be found most desirable and economical to employ a so-called hard para-coumarone resin (melting point 90° C. or above) to which may be added varying amounts of a softer fraction for the purpose of tempering the whole to the desired plasticity and tackiness. Other binder materials, which are within the purview of our invention and which may be substituted for the preferred para-coumarone resin, include those synthetic phenol-aldehyde resins which are characterized by low acid value and solubility in water-miscible solvents.

The solvent for the binder must be water-miscible to a substantial degree if not completely. Also it should be substantially anhydrous. Its anhydrous character is desirable to prevent interaction with the filler material employed, while its property of water-miscibility is vital to assure its rapid dissipation, particularly where the adhesive is applied over damp sub-surfaces. When employing para-coumarone resin as the preferred binder, we have found the preferred solvents to be acetone, methylethyl ketone, or mixtures thereof. Other solvents which have the ability to dissolve the resinous binder and possess the proper degree of volatility, and which are miscible with water, at least to a substantial extent, may be used. A further example of a suitable solvent is that known in the trade as "cellosolve" (monomethyl ether of ethylene glycol). Also, where the synthetic phenol-aldehyde resins are employed as the binder material, alcohol may be used in the solvent. With respect to the character of the solvent, it should be particularly noted that our invention requires the use of a water-miscible solvent which, insofar as we know, is contrary to all prior practice of formulating adhesives having a para-coumarone resin binder where water-immiscible solvents have heretofore invariably been used.

The nature and character of the filler material of our improved adhesive is also of vital importance. In contradistinction to the inert character of fillers commonly used, we employ a filler which is water-reactive, that is, which functions to rapidly absorb and combine with any free moisture present and to become permanently hardened thereby. We have found that finely ground, quick setting Portland cement is the preferred filler as it hardens quickly upon the absorption of moisture and, once hardened, is permanently resistant to water or alkaline solutions.

While Portland cement best serves the desired functions of a filler material, it possesses a tendency to settle and cause the composition to cake. To overcome this, we have found it desirable to add a small proportion of a fibrous material to serve as a suspension agent. For this purpose we prefer asbestine or asbestos.

As a typical and preferred formula for our improved adhesive composition, we give the following:—

| | Percent |
|---|---|
| Para-coumarone resin | 27.8 |
| Hard (M. P. 100 to 115° C.) | 90 |
| Soft (M. P. 20 to 30° C.) | 10 |
| Portland cement | 57.2 |
| Asbestine | 4.6 |
| Solvent | 10.4 |
| Acetone | 20 |
| Methylethyl ketone | 80 |
| | 100.0 |

It will be observed that the improved adhesive of our invention is distinguished in several respects from adhesive compositions heretofore known. Thus, in combination with the water and alkali-resistive binder, it comprises a water-reactive filler which functions to absorb and combine with any moisture which may be present, thus effectively removing the moisture and becoming itself permanently hardened. Again, the solvent for the resinous binder is especially selected for its water-miscibility. This property provides for rapid evaporation or dissipation of the solvent into moisture-containing sub-surfaces, thus effecting quick setting of the adhesive and preventing any deleterious action of the solvent on the linoleum. Inert filler of clay, talc, etc., employed in prior adhesives as above set forth may be added to the adhesive of this invention, but the proportion thereof so added should not be such as to impair unduly the function of the important components thereof.

Our improved adhesive may, of course, be used for bonding linoleum or other material, to dry as well as to moisture-containing sub-surfaces. It is especially suited, however for installations on fresh or "green" concrete, and in serving this purpose it fulfills a long felt want. Where the adhesive is employed over dry sub-surfaces, the setting of the composition occurs chiefly through the dissipation of the solvent. On the other hand, when the adhesive is applied over damp sub-surfaces, the setting is obtained not only by dissipation of the solvent but also by the interaction of the filler with the moisture present, such interaction causing permanent hardening of the filler.

What is claimed is,

1. An adhesive composition comprising para-coumarone resin, a water-miscible substantially anhydrous solvent therefor, and Portland cement.

2. An adhesive composition comprising para-coumarone resin, a water-miscible substantially anhydrous solvent therefor, Portland cement, and a fibrous suspension agent.

3. An adhesive composition comprising para-coumarone resin, a solvent containing acetone and methylethyl ketone, and Portland cement.

4. An adhesive composition comprising 20% to 35% of para-coumarone resin, a water-miscible substantially anhydrous solvent therefor, and 45% to 70% of Portland cement.

5. An adhesive composition comprising 25% to 30% of para-coumarone resin, a water-miscible substantially anhydrous solvent therefor, 50% to 60% of Portland cement, and a fibrous suspension agent.

6. An adhesive composition comprising 25% to 30% of para-coumarone resin, 8% to 12% of a solvent mixture containing acetone and methylethyl ketone, and 50% to 60% of Portland cement.

7. An adhesive composition comprising synthetic phenol-aldehyde resin low in acid value and soluble in water-miscible substantially anhydrous solvents, a water-miscible substantially anhydrous solvent therefor, and Portland cement.

8. An adhesive composition comprising synthetic phenol-aldehyde resin low in acid value and soluble in water-miscible substantially anhydrous solvents, a water-miscible substantially anhydrous solvent therefor, Portland cement, and a fibrous suspension agent.

9. An adhesive composition adapted for bonding a surface covering to a moisture-containing sub-surface and substantially permanently unaffected by moisture when hardened, said composition comprising Portland cement, an alkali- and water-resistant resin soluble in water-miscible anhydrous solvents and substantially non-reactive with Portland cement, and a water-miscible substantially anhydrous solvent for said resin.

10. An adhesive composition adapted for bonding a surface covering to a moisture-containing sub-surface and substantially permanently unaffected by moisture when hardened, said composition comprising Portland cement, an alkali- and water-resistant resin soluble in water-miscible anhydrous solvents and substantially non-reactive with Portland cement, a water-miscible substantially anhydrous solvent for said resin, and a fibrous suspension agent.

11. An adhesive composition adapted for bonding a surface covering to a moisture-containing sub-surface and substantially permanently unaffected by moisture when hardened, said composition comprising Portland cement; an alkali- and water-resistant resin soluble in water-miscible anhydrous solvents, substantially non-reactive with Portland cement, and selected from the group consisting of (a) para-coumarone resin and (b) synthetic phenol-aldehyde resins relatively low in acid value; and a water-miscible substantially anhydrous solvent for said resin.

12. An adhesive composition adapted for bonding a surface covering to a moisture-containing sub-surface and substantially permanently unaffected by moisture when hardened, said composition comprising Portland cement; an alkali- and water-resistant resin soluble in water-miscible anhydrous solvents, substantially non-reactive with Portland cement, and selected from the group consisting of (a) para-coumarone resin and (b) synthetic phenol-aldehyde resins relatively low in acid value; a water-miscible substantially anhydrous solvent for said resin, and a fibrous suspension agent.

ROBERT D. BONNEY.
ARNAUD G. DE BOER.